Patented Dec. 5, 1950

2,533,185

UNITED STATES PATENT OFFICE 2,533,185

ALKYL MALONAMATES AS AZO COUPLING COMPONENTS IN DIAZOTYPE LAYERS

Henry C. Unkauf, Endicott, N. Y., assignor to General Aniline & Film Corporation, New York, N. Y., a corporation of Delaware No Drawing. Application October 22, 1947, Serial No. 781,505

4 Claims. (Cl. 95—6)

This invention relates to diazotype photoprinting and, more particularly, to improved compositions for sensitizing diazotype photoprinting materials.

Diazotype photoprinting materials commonly comprise a light sensitive layer in or on the surface of a suitable carrier or base, and containing a light sensitive diazo compound, which can be partly or completely destroyed or rendered incapable of coupling with an azo coupling component upon exposure to light. Exposure of such a layer to light of locally varied intensity in accordance with an original pattern or design to be reproduced (e. g., by exposure to light under a photographic transparency, line drawing or the like) yields an image which can be developed with an azo coupling component to form a positive copy of the original. In two component layers, an azo coupling component is generally incorporated with the light sensitive diazo compound, together with stabilizers to prevent coupling prior to development, and the image is developed by treatment with an alkaline vapor such as ammonia, or with an alkaline developing solution. In the case of one component layers which contain only a light sensitive diazo compound without a coupling component, the latter can be applied in a developer solution.

Azo coupling components yielding yellow shades with light sensitive diazo compounds have been used heretofore in two component diazotype sensitizing compositions. Sensitizers yielding yellow images are used particularly in cases in which it is desired to form an image which is opaque to ultraviolet light, as in the preparation of transition copies from an original which are to be used in turn as original for the production of further copies. For such use, the image produced should be not only characterized by good opacity to ultraviolet light, but must also have good fastness to light to withstand the relatively strong actinic illumination to which it is subjected during further copy making. Another application of sensitizing materials yielding yellow images is in conjunction with other sensitizing ingredients to yield desired mixed shades. For example, yellow yielding ingredients can be combined with other ingredients yielding blue shades and minor amounts of red shades to form a gray to black image. In this application also, fastness of the coloration produced to light is important, since otherwise undesirable changes in shade of the copy would occur upon exposure to light. When such mixed color images are employed as transition copies for the production of further copies, it is similarly important that the yellow component be opaque to ultraviolet light, since the blue dyestuffs ordinarily included therein have relatively poor opacity to ultraviolet rays.

Finally, it is highly desirable that the sensitizing compositions remain stable against premature coupling or deterioration on storage (i. e., that they possess good "shelf life"), in order that the sensitized material can be conveniently stored and marketed.

One of the principal classes of diazotype sensitizing compositions yielding yellow images on development includes as couplers, compounds of the acyl acetic acid amide series, which couple with light sensitive diazo compounds at the inter-carbonyl methylene group. However, when coupling components of this class are incorporated in two component diazotype sensitizing compositions, it has been found that the resulting photoprinting material has unsatisfactory stability in storage, or poor "shelf life." Moreover, the colored images produced with this class of coupling components have poor fastness to light, and also poor opacity to ultraviolet radiation.

I have found that the aforesaid defects of diazotype sensitizing compositions can be overcome by incorporating a malonamic acid as a coupling component in a diazotype sensitizing composition containing a light sensitive diazo compound. The aforesaid coupling components, suitable for use in accordance with this invention, have the following general formula:

$$\begin{matrix} R_1 \\ \phantom{x}\diagdown \\ & N-CO-CH_2-COOR_3 \\ \phantom{x}\diagup \\ R_2 \end{matrix}$$

wherein $R_1$ and $R_2$ are respectively members of the group consisting of hydrogen, alkyl, hydroxyalkyl and aralkyl groups, and $R_3$ is a member of the group consisting of alkyl and aryl radicals. Like the acyl acetic acid amides, these compounds couple with light sensitive diazo compounds at the inter-carbonyl methylene group to form yellow images, which differ however, from those produced with acyl acetic acid amides in that they possess outstanding fastness to light and opacity to ultraviolet light. Moreover, two component layers containing the aforesaid coupling components possess excellent stability in storage, or "shelf life."

Thus, the coupling components of my invention can be advantageously used with light sensitive diazo compounds to form two component compositions well adapted for storage and marketing. Moreover, when incorporated in two component diazotype compositions, or when used for development of photoprinting material sensitized with a one component composition, they yield durable prints, in which the yellow coloration is fast to light, and which are particularly satisfactory as transition prints because of the opacity of the resulting yellow coloration to ultraviolet light.

The following example illustrates a two component sensitizing composition including a coupler in accordance with my invention.

*Example*

A sensitizing solution was prepared by dissolving the following ingredients in 60 cc. of water, and thereupon diluting with water to a volume of 100 cc.:

10 cc. glycol
10 g. citric acid
5 g. thiourea
5 g. zinc chloride
0.1 g. saponin
5 g. zinc chloride double salt of p-N-diethyl-aminobenzene diazonium chloride
3 to 6 g. ethyl malonamate A suitable base such as paper, or a regenerated cellulose film, was impregnated with the resulting solution, and after drying, the resulting sensitized material was exposed to light under an original to be reproduced. The image thus formed was developed by exposure to ammonia vapor in the usual manner, whereby a yellow image was obtained having excellent light fastness, as well as excellent opacity to ultraviolet light. The resulting material could, moreover, be stored for long periods without substantial deterioration in its light sensitive and photoprinting properties.

Upon substitution for the ethyl malonamate employed in the foregoing example, of similar amounts of methyl malonamate, or of ethyl N-methyl-malonamate, the resulting photosensitive material and copies obtained therewith had the same advantageous properties as those of the foregoing example.

Other malonamic acid esters suitable for use as couplers for sensitizing diazotype layers in accordance with this invention, or for development of light sensitive one component layers, include ethyl, isopropyl, butyl, benzyl, and phenyl esters of N-dimethyl-, N-diethyl-, N-monobenzyl-, N-benzylethyl-, N-mono(2'-hydroxyethyl)-, N-di-(2'-hydroxyethyl)-, and N-benzyl-2'-hydroxyethyl-malonamic acids. Suitable light sensitive diazo components include generally diazo compounds derived from 1,2-, 2,1- and 1,4-amino-naphthols, and from p-diamines of the benzene series which have one or two substituents on the undiazotized amino groups. Examples of such diazo compounds as are commonly used as sensitizing components are the diazo derivatives of 4-monoethylamino-m-toluidine, p-amino-N-methylaniline, p-amino-N-2'-hydroxyethylaniline, p-amino-N-ethyl-N-2'-hydroxyethyl aniline, 4-amino-2-methoxy-N-cyclohexyl aniline, p-amino-N-diethyl-m-toluidine, 3-aminocarbazole, 1-amino-2-naphthol-4-sulfonic acid, and 2-amino-1-hydroxy-3,6-naphthalene-disulfonic acid.

To produce black shades, the yellow forming malonamic acid ester coupling components of this invention can be used in conjunction with other coupling components yielding blue and reddish shades such as phloroglucinol, resorcinol, and $\beta$-naphthol. Stabilizers such as citric, tartaric, or formic acids can be employed in the sensitizing compositions, as well as anti-oxidants such as thiourea or other stabilizing materials. Metal salts such as nickel sulfate can be used to modify the coloration of the image. Water-soluble organic solvents such as methanol, butanol, isopropanol, or dioxane can replace part of the water, particularly for sensitizing films or foils of plastic materials which are more readily penetrated by organic water-miscible solvents of this type than by water alone.

Development of an exposed two component layer of this invention is conveniently carried out by treatment with an alkaline vapor, especially ammonia. However, aqueous alkaline solutions can also be used containing, for example, sodium carbonate or tri-sodium phosphate, in a wet or semi-wet development process. In the case of one component diazotype material containing only a light sensitive diazo component, the coupling components of this invention can be applied to the exposed prints in an aqueous alkaline developing solution.

Other variations and modifications which will be obvious to those skilled in the art can be made in this invention without departing from the scope or nature thereof.

I claim:

1. Diazotype photoprinting material comprising a light sensitive layer sensitized against coupling prior to development thereof, comprising a light sensitive diazo compound and a coupling component of the following general formula:

$$\begin{matrix} R_1 \\ & \searrow \\ & & N-CO-CH_2-COOR_3 \\ & \nearrow \\ R_2 \end{matrix}$$

wherein $R_1$ and $R_2$ are respectively members of the group consisting of hydrogen, alkyl, hydroxyalkyl, and aralkyl residues, and $R_3$ is a member of the group consisting of alkyl and aryl radicals.

2. Diazotype photoprinting material as defined in claim 1 wherein said coupling component is ethyl malonamate.

3. Diazotype photoprinting material as defined in claim 1 wherein said coupling component is methyl malonamate.

4. Diazotype photoprinting material as defined in claim 1 wherein said coupling component is ethyl N-methyl-malonamate.

HENRY C. UNKAUF.

REFERENCES CITED

The following references are of record in the file of this patent:

UNITED STATES PATENTS

| Number | Name | Date |
|---|---|---|
| 1,989,065 | Schmidt et al. | Jan. 22, 1935 |
| 2,217,189 | Sus et al. | Oct. 8, 1940 |
| 2,269,481 | Reindorp | Jan. 13, 1942 |
| 2,312,040 | Kendall et al. | Feb. 23, 1943 |
| 2,313,498 | Allen et al. | Mar. 9, 1943 |
| 2,331,326 | Kendall et al. | Oct. 12, 1943 |
| 2,334,495 | Kendall et al. | Nov. 16, 1943 |
| 2,453,661 | Glass et al. | Nov. 9, 1948 |